United States Patent [19]

Nanno

[11] Patent Number: 5,080,330
[45] Date of Patent: Jan. 14, 1992

[54] FLUID-FILLED CYLINDRICAL ELASTIC MOUNT HAVING AXIALLY EXTENDING AND DIAMETRICALLY OPPOSITE THIN-WALLED ELASTIC PORTIONS

[75] Inventor: Takanobu Nanno, Kasugai, Japan
[73] Assignee: Tokai Rubber Industries, Ltd., Japan
[21] Appl. No.: 536,026
[22] Filed: Jun. 11, 1990

[30] Foreign Application Priority Data

Jun. 15, 1989 [JP] Japan ................... 1-153255

[51] Int. Cl.$^5$ ................................ F16F 5/00
[52] U.S. Cl. .................. 267/140.1 C; 267/219; 248/562
[58] Field of Search ........... 267/35, 140.1 C, 140.1 R, 267/141.2, 140.5, 219, 140.1; 248/562, 604, 631, 634, 635, 609

[56] References Cited

U.S. PATENT DOCUMENTS

| | | | |
|---|---|---|---|
| 4,623,135 | 11/1986 | Ray | 248/562 X |
| 4,854,561 | 8/1989 | Kanda | 267/140.1 C |
| 4,865,299 | 9/1989 | Goto | 267/141.2 X |
| 4,889,328 | 12/1989 | Uno et al. | 267/141.2 X |
| 4,936,556 | 6/1990 | Makibayashi et al. | 267/140.1 R |

FOREIGN PATENT DOCUMENTS

| | | | |
|---|---|---|---|
| 0295795 | 5/1988 | European Pat. Off. | 267/219 |
| 48310 | 1/1973 | Japan . | |
| 60-03508 | 1/1985 | Japan | 248/636 |
| 60-245849 | 12/1985 | Japan . | |
| 1063863 | 3/1967 | United Kingdom . | |

Primary Examiner—Douglas C. Butler
Assistant Examiner—Josie A. Ballato
Attorney, Agent, or Firm—Oliff & Berridge

[57] ABSTRACT

A fluid-filled cylindrical elastic mount including an inner sleeve, a flange member fixed to one axial end of the inner sleeve, an outer sleeve having a cylindrical portion and a flange portion which is positioned opposite to the flange member in its axial direction, and a first and a second elastic body which are interposed between the inner and outer sleeves and between the flange member and the flange portion, respectively. These first and second elastic bodies cooperate with each other to define an annular fluid chamber which is filled with a non-compressible fluid. At least one resonance member is accommodated in the fluid chamber, and cooperates with an inner wall of the fluid chamber to define a resonance portion through which the fluid is caused to flow upon application of a vibrational load. The first elastic body includes a pair of thin-walled portions which are formed on diametrically opposite sides of the inner sleeve. Each of the thin-walled portions extends between the inner and outer sleeve, in a direction substantially parallel to the axial direction of the inner and outer sleeve, and has axially opposite ends connected to the inner and outer sleeves, respectively.

14 Claims, 6 Drawing Sheets

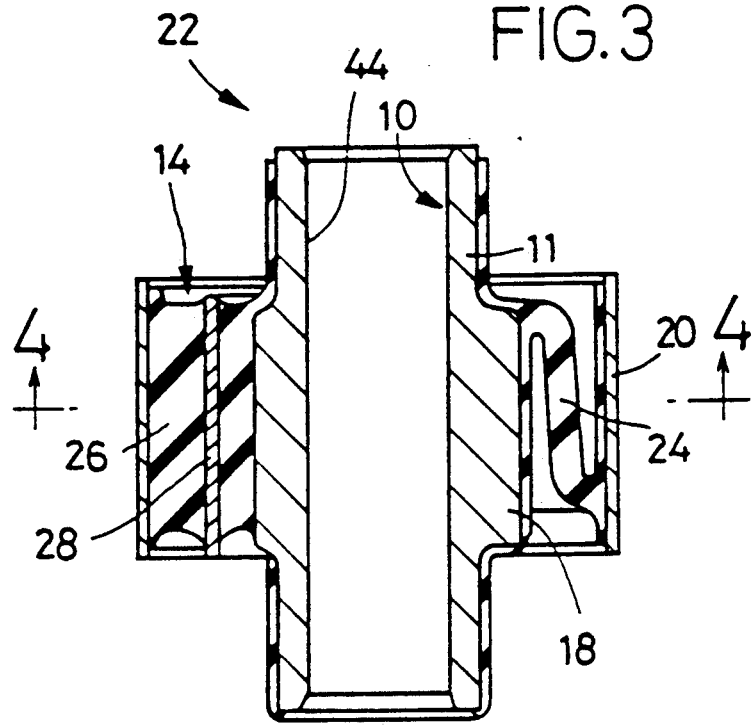
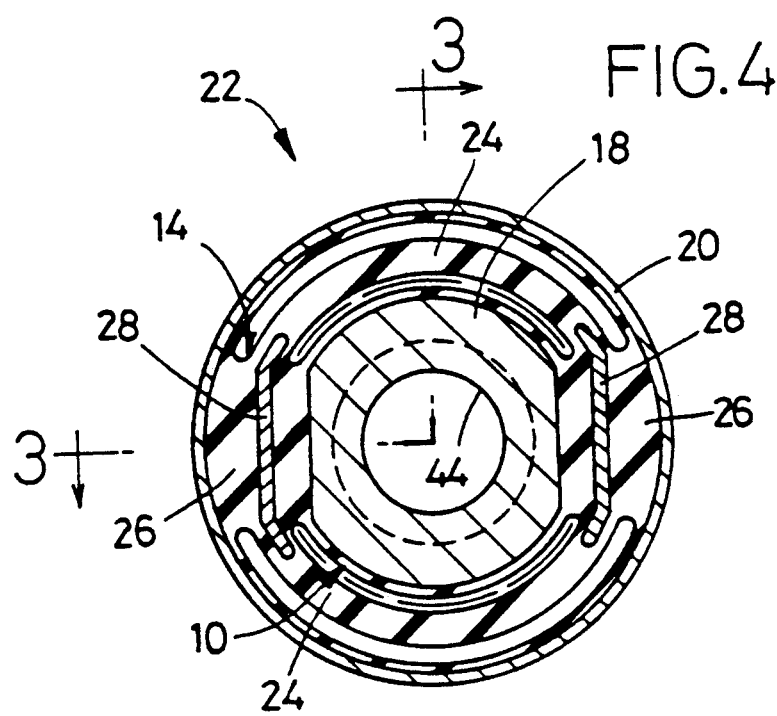

FLUID-FILLED CYLINDRICAL ELASTIC MOUNT HAVING AXIALLY EXTENDING AND DIAMETRICALLY OPPOSITE THIN-WALLED ELASTIC PORTIONS

BACKGROUND OF THE INVENTION

1. Field of the Invention

The present invention relates generally to a fluid-filled cylindrical elastic mount adapted to damp and/or isolate an input vibrational load, based on flows of a fluid contained in a fluid chamber. More particularly, the invention is concerned with such a fluid-filled elastic mount which is simple in construction and can be easily manufactured with high efficiency, and which exhibits excellent vibration isolating characteristics with respect to vibrations applied in the axial direction of the mount, based on the flows of the fluid, while assuring desired vibration damping/isolating characteristics with respect to vibrations applied in radial directions perpendicular to the axial direction indicated above.

2. Discussion of the Prior Art

A cylindrical elastic mount is known for elastically connecting two members in a vibration transmitting system, in a vibration damping or isolating manner. Examples of such a cylindrical elastic mount are disclosed in Publication No. 48-310 of examined Japanese Utility Model Application, and British Patent 1,063,863. The elastic mount as disclosed therein has an inner and an outer sleeve which are disposed in mutually radially spaced-apart relationship with each other, and an elastic body which elastically connects the inner and outer sleeves. This type of elastic mount exhibits predetermined vibration damping and/or isolating characteristics with respect to input vibrations applied in the axial and radial directions of the mount.

In some cases, the cylindrical elastic mount as described above is required to provide different vibration damping or isolating characteristics for input vibrations applied in respective different directions of the mount, e.g., in one axial direction of the mount and two mutually orthogonal diametrical directions perpendicular to the above axial direction. A typical example is an elastic mount which is installed between a suspension member used for a motor vehicle and a body of the vehicle, for connecting the suspension member to the vehicle body. Such a vehicle body mount is required to exhibit a sufficiently low dynamic spring constant with respect to the vibrations applied in the axial direction of the mount or the vertical direction of the vehicle, so as to reduce noises such as road-oriented noises and thereby improve the driving comfort of the vehicle. The body mount is also required to exhibit relatively high hardness or rigidity with respect to the vibrations applied in one of the two orthogonal diametrical directions of the mount, or the transverse direction of the vehicle, so as to prevent postural changes of the vehicle and thereby improve driving stability or maneuverability of the vehicle. Further, the body mount is required to exhibit relatively low hardness or rigidity with respect to the vibrations applied in the other diametrical direction or the front-rear direction of the vehicle, so as to reduce harshness or other vibrations and thereby improve the driving comfort of the vehicle.

In an attempt to meet the above requirements, there is proposed a fluid-filled type elastic assembly or mount, as disclosed in laid-open Publication No. 60-245849 of unexamined Japanese Patent Application, which is assigned to the same assignee as the present application. The disclosed elastic mount has a pair of fluid chambers located between the inner and outer sleeves which are connected by the elastic body, such that the fluid chambers are formed on the axially opposite sides of a partition member which is also provided between the inner and outer sleeves. Such a fluid-filled elastic mount exhibits a relatively low dynamic spring constant with respect to the axially applied vibrations, based on flows of a fluid through an orifice passage which communicates with the fluid chambers. Further, the elastic body for connecting the inner and outer sleeves has a pair of diametrically opposite portions having a relatively large thickness, which portions are opposed to each other in one of the two orthogonal diametrical directions of the mount. This arrangement permits the mount to exhibit relatively high rigidity for the vibrations applied in the above one diametrical direction. In addition, the elastic body has another pair of diametrically opposite portions having a relatively small thickness, which portions are opposed to each other in the other diametrical direction of the mount, whereby the mount is able to exhibit relatively low rigidity for the vibrations applied in the other diametrical direction.

In the disclosed fluid-filled elastic mount, however, the elastic body consists of a first and a second elastic body which connect the inner and outer sleeves with each other at their axially opposite ends, for axially defining an enclosed space between the inner and outer sleeves, and a third elastic body which connects the inner and outer sleeves with each other at their axially intermediate portions, and serves as a partition wall for dividing the enclosed space into two axially aligned fluid chambers. In addition, the elastic mount requires an orifice passage for communicating with the two fluid chambers located on the axially opposite sides of the partition member. Thus, the conventional elastic mount is extremely complicated in construction, and suffers from some problems in terms of assembling procedures and manufacturing cost.

SUMMARY OF THE INVENTION

The present invention was developed in view of the drawback encountered in the prior art. It is therefore an object of the present invention to provide a fluid-filled cylindrical elastic mount which is simple in construction and can be easily manufactured with high efficiency, and which exhibits a relatively low dynamic spring constant with respect to axially applied vibrations, based on resonance of a fluid contained therein, while assuring relatively high rigidity of its portions which are opposed to each other in one diametrical direction of the mount, and relatively low rigidity of its portions which are opposed to each other in another diametrical direction orthogonal to the above one diametrical direction.

The above object may be achieved according to the principle of the present invention, which provides a fluid-filled cylindrical elastic mount comprising (a) an inner sleeve including a cylindrical portion, (b) a flange member fixed to one axial end of the cylindrical portion of the inner sleeve, and extending radially outwardly from the one axial end of the cylindrical portion, (c) an outer sleeve having a cylindrical portion which is disposed radially outwardly of the cylindrical portion of the inner sleeve, with a predetermined radial spacing left therebetween, and a flange portion which is positioned opposite to the flange member in the axial direction of the mount, with a predetermined axial spacing left therebetween, (d) a first elastic body having a generally cylindrical shape, which is interposed between the inner sleeve and the cylindrical portion of the outer sleeve, for elastically connecting the inner and outer sleeves to each other, (e) a second elastic body having a generally annular shape, which is interposed between the flange member and the flange portion of the outer sleeve, for elastically connecting the flange member and the outer sleeve to each other. The first and second elastic bodies cooperate with each other to define an annular fluid chamber located between the inner and outer sleeves, the fluid chamber being filled with a non-compressible fluid. The present elastic mount further comprises at least one resonance member accommodated in the fluid chamber, the above-indicated at least one resonance member having an outer surface cooperating with an inner wall of the fluid chamber to define a resonance portion through which the non-compressible fluid is caused to flow upon application of a vibrational load, the resonance portion having a predetermined clearance between the outer surface and the inner wall. The first elastic body includes a pair of thin-walled portions which are formed on diametrically opposite sides of the inner sleeve, such that the pair of thin-walled portions are opposed to each other in one diametrical direction of the mount, each of the pair of thin-walled portions extending between the inner and outer sleeves, in a direction substantially parallel to the axial direction of the inner and outer sleeves, and having axially opposite ends one of which is connected to the inner sleeve, and the other of which is connected to the outer sleeve.

The fluid-filled cylindrical elastic mount constructed as described above effectively exhibits a considerably low dynamic spring constant with respect to the axially applied vibrations, based on flows of the non-compressible fluid through the resonance portion, while sufficiently assuring both comparatively hard spring characteristics in its portions opposite to each other in one diametrical direction, and comparatively soft spring characteristics in its portions opposite to each other in another diametrical direction perpendicular to the above one diametrical direction.

In the elastic mount of the present invention, the dynamic spring constant of the mount can be sufficiently lowered based on the fluid flows, without requiring a partition wall for dividing an enclosed space into two fluid chambers, and an orifice passage for connecting the two fluid chambers to each other, both of which have been conventionally used as described above. Namely, the elastic mount of the invention has only at least one resonance member accommodated in one fluid chamber, for providing desired vibration damping and/or isolating capability. Thus, the present elastic mount is simple in construction, and can be easily manufactured with high efficiency.

The flange member may consist of a cylindrical portion which is formed at the radially inner portion thereof, and a flange portion extending radially outwardly from one axial end of the cylindrical portion. In this case, the flange member is fixed at its cylindrical portion to the above-indicated one axial end of the cylindrical portion of the inner sleeve.

Alternatively, the flange member may consist of a flange portion which is formed integrally with the inner sleeve, so as to extend radially outwardly from the one axial end of the cylindrical portion of the inner sleeve.

The above-indicated at least one resonance member may include an annular movable block which is freely movable by a predetermined distance within the fluid chamber in the axial direction of the mount. This annular movable block may be formed of a synthetic resin, for example.

The present elastic mount may further comprise a pair of restriction plates embedded in diametrically opposite portions of the first elastic body, which portions are opposed to each other in another diametrical direction of the mount that is orthogonal to the one diametrical direction.

BRIEF DESCRIPTION OF THE DRAWINGS

The foregoing and optional objects, features and advantages of the present invention will be better understood by reading the following detailed description of a presently preferred embodiment of the invention, when considered in connection with the accompanying drawings, in which:

FIG. 3 is an elevational axial cross sectional view depicting a first integral assembly prepared during manufacturing of the body mount of FIG. 1, taken along line III—III of FIG. 4;

FIG. 4 is an elevational transverse cross sectional view taken along line IV—IV of FIG. 3;

DETAILED DESCRIPTION OF THE PREFERRED EMBODIMENT

Figure 1:
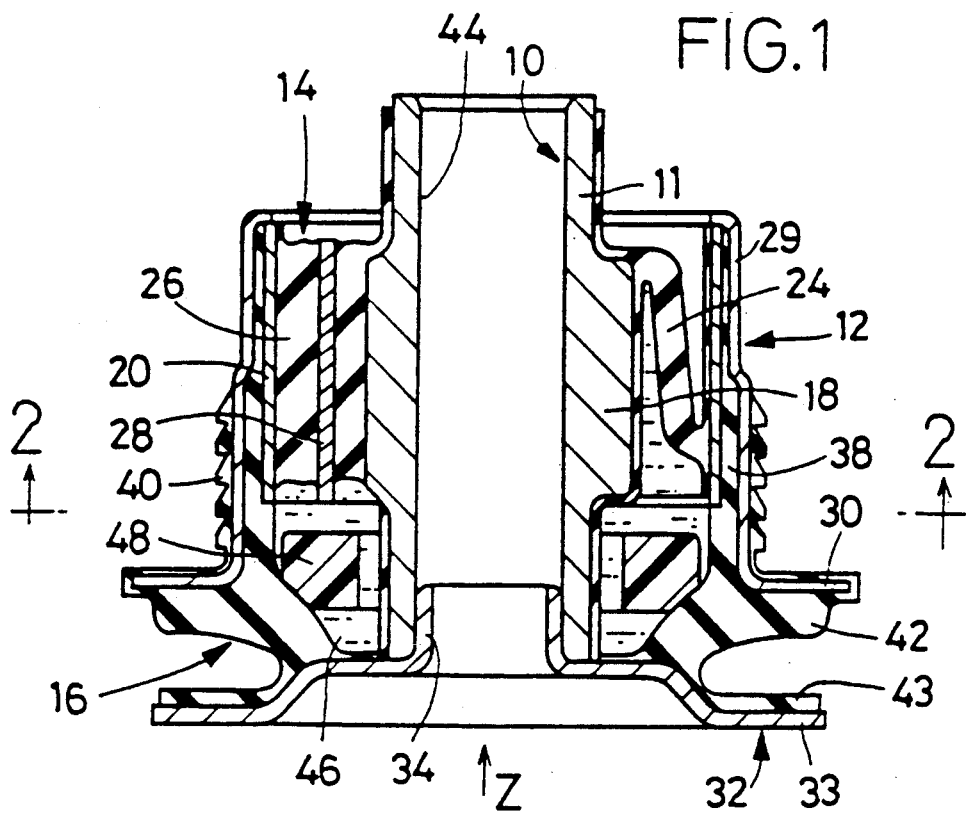
FIG. 1 is an elevational view in axial cross section of one embodiment of a fluid-filled cylindrical elastic mount of the present invention in the form of a body mount for a motor vehicle, taken along line I—I of FIG. 2.
Figure 2:
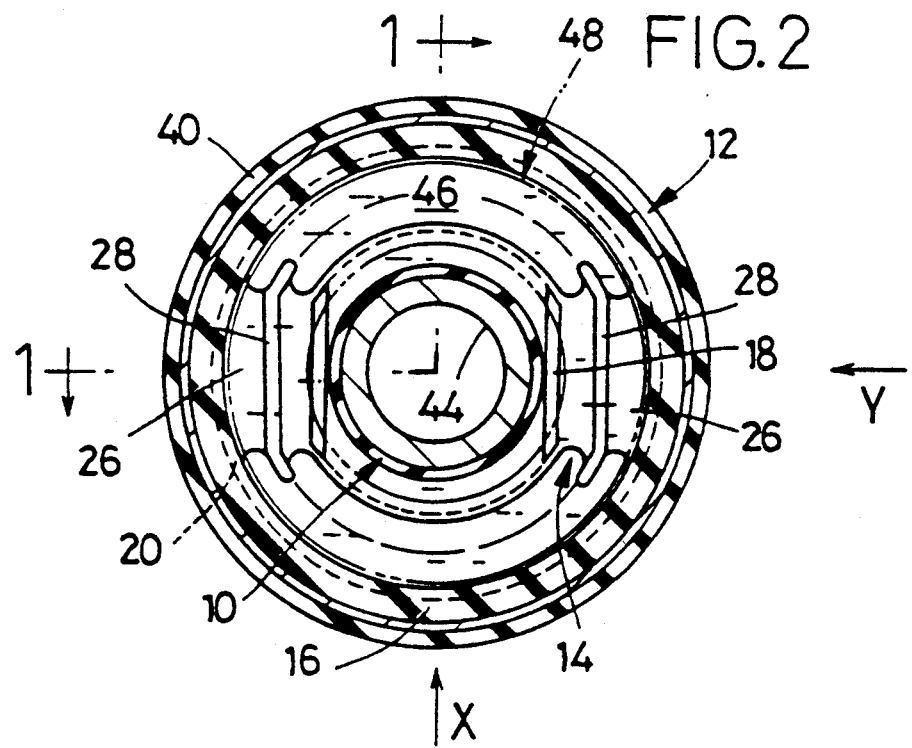
FIG. 2 is an elevational view in transverse cross section of the body mount of FIG. 1, taken along line II—II of FIG. 1.

Referring first to FIGS. 1 and 2, reference numeral 10 denotes a metallic inner sleeve of a body mount suitably adapted for mounting a member of a suspension system on a body of a motor vehicle. Radially outwardly of this inner sleeve 10, there is disposed a metallic outer sleeve 12 in coaxial relationship with the inner sleeve 10, such that the inner and outer sleeves 10, 12 are radially spaced apart from each other by a predetermined suitable distance.

Between the metallic inner and outer sleeves 10, 12, there are interposed a first and a second elastic body 14, 16 for integrally and elastically connecting the inner and outer sleeves 10, 12 to each other.

The instant body mount is installed on the motor vehicle such that the vertical direction as viewed in FIG. 1 corresponds to the vertical direction of the vehicle, and such that the vertical and horizontal directions as viewed in FIG. 2 correspond to the front-rear and transverse directions of the vehicle, respectively. This body mount is interposed between the suspension member having a mounting rod, and the vehicle body having a mounting hole, such that the mounting rod of the suspension member is inserted through an inner bore 44 formed through the inner sleeve 10 while the outer sleeve 12 is press-fitted in the mounting hole of the vehicle body.

More specifically, the inner sleeve 10 has a generally cylindrical portion 11 including a thick-walled metallic portion 18 formed at its axially intermediate portion, as shown in FIGS. 3 and 4. That is, the inner sleeve 10 has a stepped outer circumferential surface. Radially outwardly of the axially intermediate portion of the inner sleeve 10, there is disposed a metallic sleeve 20 in coaxial relationship with the inner sleeve 10, such that the inner sleeve 10 and the metallic sleeve 20 are radially spaced apart from each other by a predetermined distance. This metallic sleeve 20 has an axial length slightly larger than that of the thick-walled metallic portion 18 of the inner sleeve 10. The above-indicated first elastic body 14 having a generally cylindrical configuration is interposed between the inner sleeve 10 and the metallic sleeve 20. Namely, the inner sleeve 10, first elastic body 14, and metallic sleeve 20 are formed as a first integral assembly 22 as shown in FIGS. 3 and 4, as a result of vulcanization of an unvulcanized rubber material within a suitable mold in which the sleeves 10, 20 are set in place relative to each other. In this integral assembly 22, the first elastic body 14 is secured at its inner and outer circumferential surfaces to the inner sleeve 10 and the metallic sleeve 20, respectively.

The first elastic body 14 of the first integral assembly 22 includes a pair of thin-walled portions 24, 24 formed in diametrically opposite portions thereof between which the inner sleeve 10 is interposed. More specifically, each of the thin-walled portions 24, 24 is formed over about one-third of the circumference of the elastic body 14 as shown in FIG. 4, and extends between the inner sleeve 10 and the metallic sleeve 20 by a suitable distance, in a direction substantially parallel to the axis of the inner member 10, as shown in FIG. 3. Each thin-walled portion 24, 24 of the elastic body 14 is secured at its upper and lower axial end faces to the inner sleeve 10 and the metallic sleeve 20, respectively, by means of vulcanization. Thus, the thin-walled portions 24, 24 of the elastic body 14 are provided on the opposite sides of the inner sleeve 10 as viewed in one diametrical direction of the mount.

The first elastic body 14 further includes a pair of thick-walled elastic portions 26, 26 formed in diametrically opposite portions thereof between which the inner sleeve 10 is interposed. These thick-walled elastic portions 26, 26 are opposed to each other in a diametrical direction orthogonal to the above-indicated one diametrical direction in which the above thin-walled portions 24, 24 are opposed to each other. Each of the thick-walled elastic portions 26, 26 has at its radially intermediate portion a metallic restriction plate 28, 28 which is adapted to restrict elastic deformation of that elastic portion 26 of the elastic body 14. The above-described vulcanization process of the first integral assembly, 22 is carried out while the restriction plates 28, 28 are embedded in the respective thick-walled elastic portions 26, 26 of the first elastic body 14.

When a vibrational load is applied between the inner sleeve 10 and the metallic sleeve 20, in the diametrical direction in which the thin-walled portions 24, 24 of the first elastic body 14 are opposed to each other, the thin-walled portions 24, 24 are subjected to elastic deformation or shear strain, whereby the instant body mount exhibits comparatively soft spring characteristics. When a vibrational load is applied in the diametrical direction in which the thick-walled elastic portions 26, 26 of the first elastic body 14 are opposed to each other, the mount exhibits comparatively hard spring characteristics, in the presence of the restriction plates 28, 28 for restricting elastic deformation of those portions 26, 26 of the elastic body 14.

Figure 5:
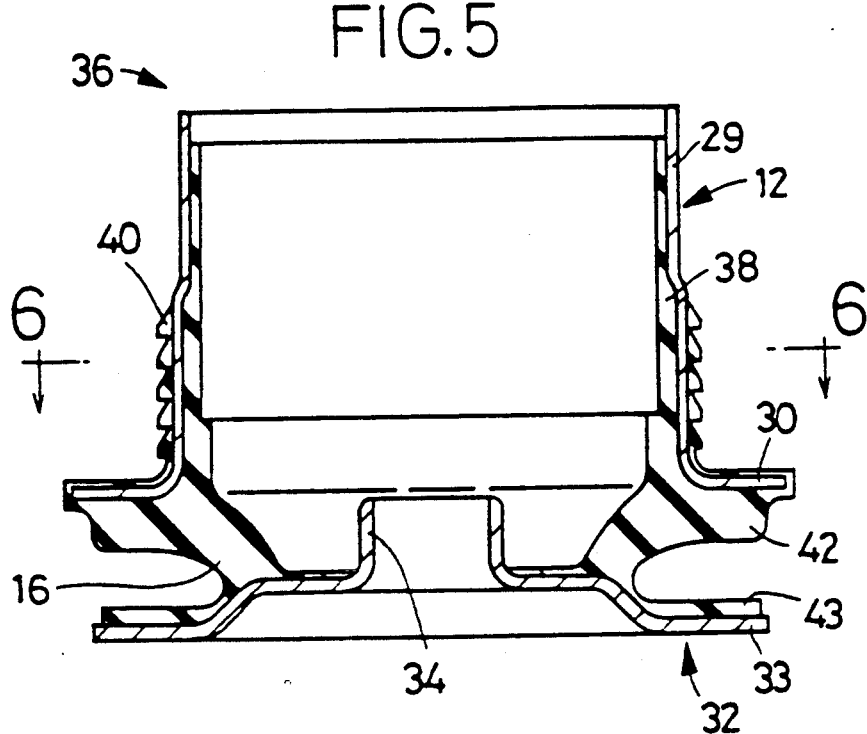
FIG. 5 is an elevational axial cross sectional view depicting a second integral assembly prepared during manufacturing of the body mount of FIG. 1.
Figure 6:
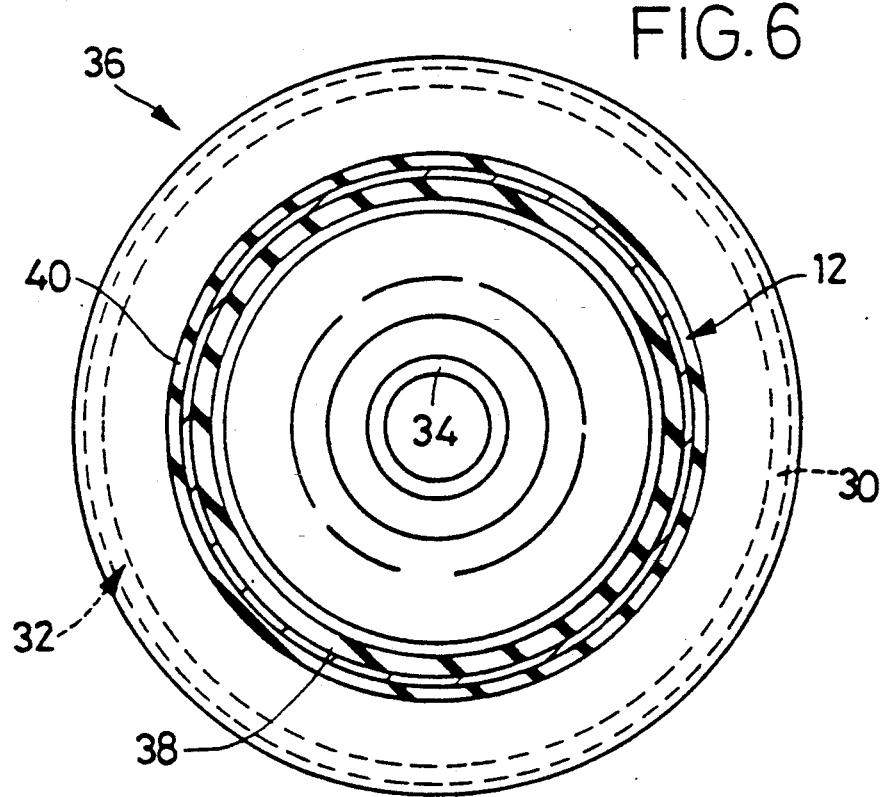
FIG. 6 is an elevational transverse cross sectional view taken along line VI—VI of FIG. 5.

Referring next to FIGS. 5 and 6, the outer sleeve 12 has a generally cylindrical portion 29 having a relatively large diameter, and an outward flange 30 formed integrally with the cylindrical portion 29. Namely, the outward flange 30 extends radially outward from one axial end of the cylindrical portion 29 of the sleeve 12. Axially outwardly of the above-indicated one axial end of the outer sleeve 12, there is disposed a flange member 32 constituted by a generally annular plate made of metal. The flange member 32 consists of a flange portion 33, and a cylindrical portion 34 formed at the radially inner portion thereof, such that the flange portion 33 extends radially outwardly from the cylindrical portion 34. This flange member 32 is positioned such that the outer sleeve 12 and the flange member 32 are axially spaced apart from each other by a predetermined suitable distance, and such that the outer peripheral portion of the flange member 32 is opposed to the outward flange 30 of the outer sleeve 12 in the axial direction of the mount. Between the mutually facing surfaces of the outward flange 30 and the flange member 32, there is interposed a second elastic body 16 having a generally tapered configuration which includes large-diameter and small-diameter axially opposite end faces. The outer sleeve 12, second elastic body 16 and flange member 32 are formed as a second integral assembly 36 by means of vulcanization. In the second integral assembly 36, the second elastic body 16 is secured at its large-diameter axial end face to the outward flange 30 of the outer sleeve 12, and at its small-diameter axial end face to the flange member 32, respectively.

In this second integral assembly 36, the second elastic body 16 extends over the inner and outer circumferential surfaces of the outer sleeve 12, to thereby provide a sealing rubber layer 38 and a mounting rubber layer 40 on the inner and outer surfaces of the sleeve 12, respectively. Namely, these rubber layers 38, 40 are formed integrally with the second elastic body 16, and secured to the outer sleeve 12 during the vulcanization process of the second integral assembly 36. On the mutually facing surfaces of the outward flange 30 of the outer sleeve 12, and the outer peripheral portion of the flange portion 33 of the flange member 32, there are provided respective buffer rubber layers 42, 43 having suitable thicknesses, which layers 42, 43 are also formed integrally with the second elastic body 16.

The second integral assembly 36 constructed as described above is attached to the above-described first integral assembly 22, in the axial direction of the mount. More specifically described referring to FIGS. 1 and 2, the cylindrical portion 34 of the flange member 32 is press-fitted in the inner bore 44 formed through the inner sleeve 10, so that the flange member 32 is integrally connected to the inner sleeve 10. On the other hand, the outer sleeve 12 is fitted on the metallic sleeve 20, and is held in position such that one axial end portion of the outer sleeve 12 remote from the outward flange 30 is caulked against the corresponding axial end of the metallic sleeve 20. Thus, the outer sleeve 12 and the metallic sleeve 20 are integrally connected to each other.

With the first and second integral assemblies 22, 36 being assembled together as described above, an annular enclosed space exists between the inner and outer sleeves 10, 12. This enclosed space extends over the entire circumference of the mount, and is axially defined by the first and second elastic bodies 14, 16. The enclosed space is filled with a suitable non-compressible fluid, to thereby provide a fluid chamber 46.

The non-compressible fluid in the fluid chamber 46 is suitably selected from the group which includes water, alkylene glycol, polyalkylene glycol, and silicone oil. Namely, the selected fluid must meet the requirement that the elastic bodies 14, 16 have a sufficient corrosion resistance to the fluid. For assuring a sufficient degree of fluidity of the fluid, the kinematic viscosity of the fluid is preferably not higher than 1000 centistrokes (cSt), more preferably not higher than 500cSt, and most preferably not higher than 100cSt. The filling of the fluid chamber 46 is effected while the first and second integral assemblies 22, 36 are assembled together within a mass of the selected non-compressible fluid contained in a suitable vessel.

Figure 7:
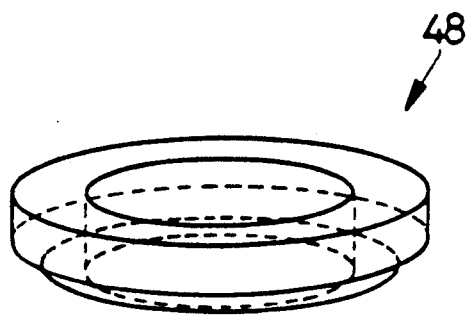
FIG. 7 is a perspective view showing a movable block used in the body mount of FIG. 1.

Upon assembling of the first and second integral assemblies 22, 36, a resonance member in the form of a movable block 48 is introduced into the fluid chamber 46, such that the block 48 is held in position within the fluid chamber 46, as shown in FIG. 1. As specifically shown in FIG. 7, this movable block 48 has an annular configuration and a profile substantially following the shape of the inner surface of the fluid chamber 46. Since the dimensions of the movable block 48 are somewhat smaller than those of the fluid chamber 46, the block 48 is freely movable by a predetermined distance within the fluid chamber 46.

The movable block 48 may be formed of any material provided that it is unlikely to be deformed, and has a sufficient corrosion resistance to the fluid contained in the fluid chamber 46. For instance, metal, resin and a highly elastic rubber material may be preferably employed for the block 48. In this specific embodiment, the movable block 48 is formed of a synthetic resin, and is held in contact with the lower surface of the fluid chamber 46, as indicated in FIG. 1, while the body mount is in a static-load condition wherein no dynamic load acts on the mount.

Figure 8:
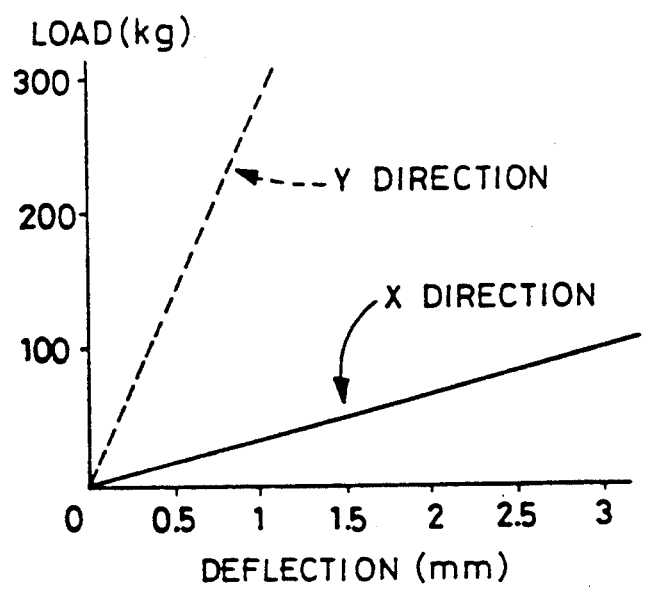
FIG. 8 is a graph showing experimental data indicating load-deflection or stress-strain characteristics of the body mount of FIG. 1, when a vibrational load is applied to the body mount of FIG. 1, in two orthogonal directions perpendicular to the axis of the mount.
Figure 9:
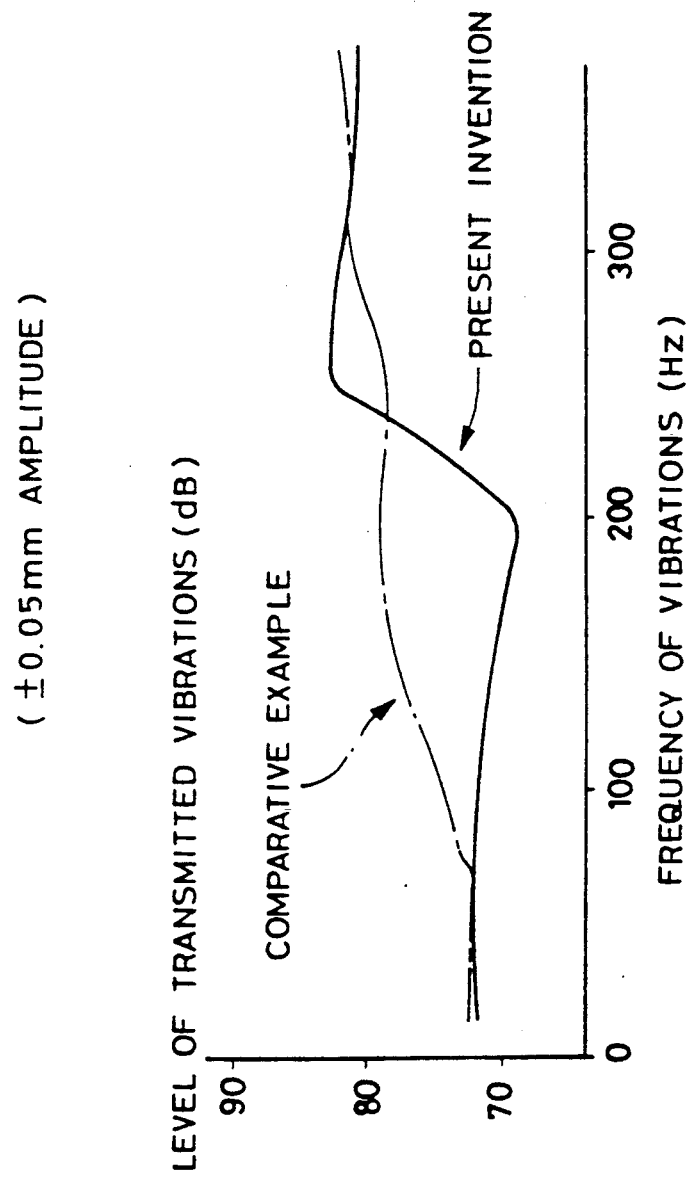
FIG. 9 is a graph showing experimental data indicating vibration damping/isolating characteristics of the body mount of FIG. 1, as compared with those of a comparative example.

When a dynamic vibrational load is applied between the inner and outer sleeves 10, 12, in one diametrical direction indicated by an arrow X in FIG. 2, in which the thin-walled portions 24, 24 of the first elastic body 14 are opposed to each other, the body mount constructed as described above exhibits comparatively soft spring characteristics, as is apparent from the graph of FIG. 8. When a vibration load is applied between the inner and outer sleeves 10, 12, in another diametrical direction indicated by an arrow Y in FIG. 2, in which the thick-walled elastic portions 26, 26 of the first elastic body 14 are opposed to each other, the instant body mount exhibits comparatively hard spring characteristics, as also indicated in the graph of FIG. 8. Upon application of a vibrational load between the inner and outer sleeves 10, 12, in the axial direction of the mount indicated by an arrow Z in FIG. 1, the inner and outer sleeves 10, 12 are displaced relative to each other in the axial direction, and the fluid chamber 46 is elastically deformed, whereby there arise repetitive flows of the fluid in the fluid chamber 46. Thus, the instant body mount is capable of exhibiting a significantly lowered dynamic spring constant with respect to the input vibrations in a predetermined frequency range, based on the flows of the fluid in the chamber 46, as indicated in the graph of FIG. 9.

Figure 10:
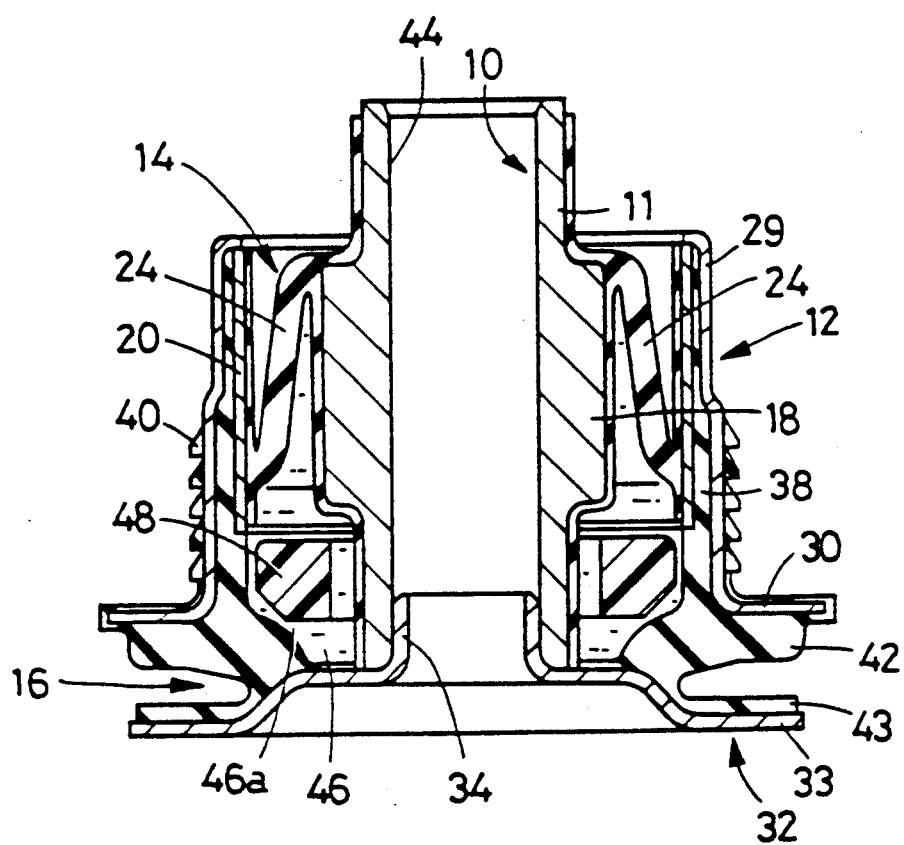
FIG. 10 is an elevational axial cross sectional view illustrating the body mount of FIG. 1 during application of a vibrational load in the axial direction of the mount.

While the operation and principle have not been fully explained in relation to the mount having the low dynamic spring constant for the axially applied vibrations, it is considered that the dynamic spring constant of the mount can be effectively lowered based on resonance of the fluid contained in the fluid chamber 46. More specifically, upon application of a dynamic vibrational load between the inner and outer sleeves 10, 12, in the axial direction of the mount, the flows of the fluid in the fluid chamber 46 cause the movable block 48 to be kept away from the lower surface of the chamber 46 and be held in a suspended state within the fluid mass, as indicated in FIG. 10. Around the movable block 48 in the suspended state during application of the vibrational load in the axial direction, there are formed fluid flow passages which include a resonance portion 46a that is defined between an outer surface of the movable block 48 and an inner wall of the fluid chamber 46. As a result, the elastic deformation of the first and second elastic bodies 14, 16 due to the application of the input vibrations causes the fluid in the chamber 46 to oscillatingly flow through the resonance portion 46a, whereby the dynamic spring constant of the mount is considerably lowered, based on the resonance of the fluid mass in the chamber 46.

The instant body mount exhibits a low dynamic spring constant with respect to the input vibrations in a predetermined frequency range, as described above. This frequency range may be suitably determined, by adjusting the dimensions (e.g., depth) of the resonance portion 46a, depending upon the spring constant of the first and second elastic bodies 14, 16, the weight of the movable block 48 and the viscosity of the fluid in the chamber 46.

It is recognized that the lowering of the dynamic spring constant of the mount due to the resonance of the fluid is accomplished on the basis of the fluid flows caused by pressure changes within the fluid chamber 46. In this respect, it may be apprehended that the pressure changes in the chamber 46 for lowering the dynamic spring constant of the mount will be absorbed or eliminated by the elastic deformation of the thin-walled portions 24, 24 of the first elastic body 14, which are adapted to provide the mount with soft spring characteristics upon application of vibrations in the above-indicated one diametrical direction (X direction). However, it is noted that these thin-walled portions 24, 24 extend between the inner and outer sleeves 10, 12, in a direction substantially parallel to these sleeves 10, 12, and therefore the thin-walled portions 24, 24 are subjected to shear strain when the sleeves 10, 12 are displaced relative to each other in the above-indicated one diametrical direction. Accordingly, the thickness of the thin-walled portions 24, 24 can be made relatively large, while assuring comparatively soft spring characteristics of the mount for the diametrically applied vibrations. It follows from the above description that the instant elastic mount is almost free from the influence of the elastic deformation of the thin-walled portions 24, 24 on the vibration isolating capability thereof with respect to the axially applied vibrations.

Thus, the use of the first elastic body 14 having the axially extending thin-walled portions 24, 24 makes it possible to give the instant engine mount both comparatively soft spring characteristics with respect to the vibrations applied in the diametrical direction in which the portions 24, 24 are opposed to each other, and a sufficiently lowered dynamic spring constant with respect to the axially applied vibrations, based on the resonance of the fluid.

As a comparative example, there was prepared a body mount having the first elastic body 14 with radially extending, annular thin-walled portions. This body mount was measured for its dynamic spring characteristics with respect to the axially applied vibrations. Referring to the graph of FIG. 9, the one-dot chain line indicates the result of the measurement associated with the comparative example, while the solid line indicates the corresponding one associated with the instant body mount according to the present invention. It will be understood from the above results that the body mount of the comparative example was not able to lower its dynamic spring constant for the axially applied vibrations. This means that the pressure changes which occurred within the fluid chamber 46 were absorbed by the elastic deformation of the annular thin-walled portions 24, 24 of the first elastic body 14, whereby no flows of the fluid occurred through the resonance portion 46a of the fluid chamber 46. It follows from the above description that the body mount of the present invention can provide a remarkable effect of lowering its dynamic spring constant, by employing the first elastic body 14 having the axially extending thin-walled portions 24, 24 as described above.

The body mount constructed as described above is installed between the suspension member and the vehicle body, such that the axial direction (vertical direction in FIG. 1) of the mount corresponds to the vertical direction of the vehicle, and such that the diametrical direction (vertical direction in FIG. 2) of the mount in which the thin-walled portions 24, 24 are opposed to each other corresponds to the front-rear direction of the vehicle, while the diametrical direction (horizontal direction in FIG. 2) of the mount in which the thick-walled elastic portions 26, 26 are opposed to each other corresponds to the transverse direction of the vehicle. With the body mount installed in position in this manner, the body mount effectively provides soft spring characteristics for the vibrations applied in the front-rear direction of the vehicle, and hard spring characteristics for the vibrations applied in the transverse direction of the vehicle, and exhibits a considerably low dynamic spring constant with respect to the vibrations applied in the vertical direction of the vehicle.

Consequently, the use of the instant body mount is effective to greatly reduce vibrations such as harshness, and noises such as road-oriented noises, while assuring significantly improved driving stability and maneuverability of the vehicle, and excellent driving comfort of the vehicle.

In the instant body mount, the fluid chamber 46 formed between the inner and outer sleeves 10, 12 is divided into two sections solely by the movable block 48 accommodated therein. Thus, the instant body mount does not require any elastic partition wall for dividing the fluid chamber into two, or any orifice passage for communicating with the two sections of the chamber. This means that the instant body mount is considerably simple in construction, and that the mount having an excellent vibration isolating capability can be easily manufactured with high efficiency, and is therefore available at a reduced cost.

While the fluid-filled elastic mount of the present invention has been described in its presently preferred embodiment, for illustrative purpose only, it is to be understood that the invention is not limited to the details of the illustrated embodiment, but various changes, modifications and improvements may be made in the invention.

While the flange member 32 is formed separately from the inner sleeve 10 in the illustrated embodiment, the flange member and inner sleeve 32, 10 may be formed as a single component.

The movable block 48 may be a foamed body or a hollow member, having a specific gravity lower than that of the non-compressible fluid contained in the fluid chamber 46, so that the movable block 48 may float on the fluid mass in the chamber 46 even while the body mount is in a static-load condition wherein no dynamic load acts on the mount.

The resonance member (movable block 48 in the illustrated embodiment) which is accommodated in the fluid chamber 46 may be fixedly supported by the inner sleeve 10 or the outer sleeve 12. Even in this case, a resonance portion may be suitably formed around the resonance member upon application of the vibrational load, so that the mount can provide a sufficiently lowered dynamic spring constant with respect to the input vibrations in a predetermined frequency range. This frequency range is suitably determined by adjusting the width or size of the resonance portion, as in the illustrated embodiment.

In the illustrated embodiment, the movable block 48 has an annular configuration. However, the resonance member may take any other form, according to the shape of the inner surface of the fluid chamber. It is also possible to provide a plurality of resonance members within the fluid chamber.

In the elastic mount of the present invention, the fluid in the fluid chamber is forced to flow through the resonance portion formed therein, when the vibrations are applied to the mount in the diametrical directions of the mount as well as its axial direction. Accordingly, the mount exhibits desired vibration damping/isolating characteristics for the vibrations applied in the diametrical directions of the mount, based on the resonance of the fluid flowing through the resonance portion. Such vibration damping/isolating characteristics of the mount can be suitably determined by adjusting the depth or other dimensions of the resonance portion around the resonance member.

Although the illustrated embodiment is adapted to be used as a body mount for a motor vehicle, the concept of the invention may be embodied as mounts for mounting a differential gear device, suspension upper supports, and engine mounts used in the motor vehicle, and other fluid-filled elastic mounts used in various machines.

It is also to be understood that the present invention may be embodied with various other changes, modifications and improvements, which may occur to those skilled in the art, without departing from the spirit and scope of the invention defined in the following claims.

What is claimed is:

1. A fluid-filled cylindrical elastic mount comprising:
    an inner sleeve including a cylindrical portion extending in an axial direction;
    a flange member fixed to one axial end of said cylindrical portion of said inner sleeve, and extending radially outwardly from said one axial end of said cylindrical portion;
    an outer sleeve having a cylindrical portion extending in said axial direction and which is disposed radially outwardly of said cylindrical portion of said inner sleeve, with a predetermined radial spacing left therebetween, and a flange portion which is positioned opposite to said flange member in the axial direction of the mount, with a predetermined axial spacing left therebetween;
    a first elastic body having a generally cylindrical shape, which is interposed between said inner sleeve and said cylindrical portion of said outer sleeve, for elastically connecting the inner and outer sleeves to each other;
    a second elastic body having a generally annular shape, which is interposed between said flange member and said flange portion of said outer sleeve, for elastically connecting said flange member and said outer sleeve to each other;
    said first and second elastic bodies cooperating with each other to define an annular fluid chamber located between said inner and outer sleeves, said fluid chamber being filled with a non-compressible fluid;
    at least one resonance member accommodated in said fluid chamber, said at least one resonance member being substantially annular in shape and having radial inner and radial outer surface, at least one of said radial inner and said radial outer surfaces cooperating with an inner wall of said fluid chamber to define a fluid passage extending substantially parallel to an axis of said inner and said outer sleeves, said fluid passage defining a resonance portion through which said non-compressible fluid is caused to flow substantially in said axial direction directly from one side of said resonance member to an opposite side thereof upon application of a vibrational load, said resonance portion having a predetermined clearance between at least one of said radial inner and said radial outer surfaces and said inner wall; and
    said first elastic body including a pair of thin-walled portions which are formed on diametrically opposite sides of said inner sleeve, such that said pair of thin-walled portions are opposed to each other in one diametrical direction of the mount, each of said pair of thin-walled portions diagonally connecting said inner and said outer sleeves, in a direction substantially parallel to the axial direction of said inner and outer sleeves, and having axially opposite ends one of which is connected to said inner sleeve, and the other of which is connected to said outer sleeve.

2. A fluid-filled cylindrical elastic mount according to claim 1, wherein said flange member consists of a cylindrical portion which is formed at the radially inner portion thereof, and a flange portion extending radially outwardly from one axial end of said cylindrical portion, said flange member being fixed at said cylindrical portion thereof to said one axial end of said cylindrical portion of said inner sleeve.

3. A fluid-filled cylindrical elastic mount according to claim 1, wherein said at least one resonance member comprises an annular movable block which is freely movable by a predetermined distance within said fluid chamber in the axial direction of the mount.

4. A fluid-filled cylindrical elastic mount according to claim 3, wherein said annular movable block is formed of a synthetic resin.

5. A fluid-filled cylindrical elastic mount according to claim 1, further comprising a pair of restriction plates, wherein said first elastic body includes a pair of thick-walled portions which are formed on diametrically opposite sides of said inner sleeve such that said pair of thick-walled portions are opposed to each other in another diametrical direction of the mount that is orthogonal to said one diametrical direction, said pair of restrictions plates being embedded in said thick-walled portions, respectively.

6. A fluid-filled cylindrical elastic mount according to claim 1, wherein said non-compressible fluid has a kinematic viscosity value not higher than 500 centistokes.

7. A fluid-filled cylindrical elastic mount according to claim 6, wherein said non-compressible fluid has a kinematic viscosity value not higher than 100 centistokes.

8. A fluid-filled cylindrical elastic mount according to claim 1, wherein at least one of said radial inner and said radial outer surfaces of the resonance member is completely detached from the inner wall of the fluid chamber, so that said fluid passage defining said resonance portion is annular in shape.

9. A fluid-filled cylindrical elastic mount according to claim 1, wherein both of said radial inner and said radial outer surfaces of said resonance member are completely detached from the inner wall of the fluid chamber such that said resonance member floats in said fluid chamber.

10. A fluid-filled cylindrical elastic mount comprising:
    an inner sleeve including a cylindrical portion extending in an axial direction;
    a flange member fixed to one axial end of said cylindrical portion of said inner sleeve, and extending radially outwardly from said one axial end of said cylindrical portion;
    an outer sleeve having a cylindrical portion extending in said axial direction and which is disposed radially outwardly of said cylindrical portion of said inner sleeve, with a predetermined radial spacing left therebetween, and a flange portion which is positioned opposite to said flange member in the axial direction of the mount, with a predetermined axial spacing left therebetween;
    a first elastic body having a generally cylindrical shape, which is interposed between said inner sleeve and said cylindrical portion of said outer sleeve, for elastically connecting the inner and outer sleeves to each other;
    a second elastic body having a generally annular shape, which is interposed between said flange member and said flange portion of said outer sleeve, for elastically connecting said flange member and said outer sleeve to each other;
    said first and second elastic bodies cooperating with each other to define an annular fluid chamber located between said inner and outer sleeves, said fluid chamber being filled with a non-compressible fluid;

at least one resonance member accommodated in said fluid chamber, said at least one resonance member being substantially annular in shape and having radial inner and radial outer surfaces, at least one of said radial inner and said radial outer surfaces cooperating with an inner wall of said fluid chamber to define a fluid passage extending substantially parallel to an axis of said inner and said outer sleeves, said fluid passage defining a resonance portion through which said non-compressible fluid is caused to flow substantially in said axial direction directly from one side of said resonance member to an opposite side thereof upon application of a vibrational load, said resonance portion having a predetermined clearance between at least one of said radial inner and said radial outer surfaces and said inner wall; and said first elastic body including a pair of thin-walled portions which are formed on diametrically opposite sides of said inner sleeve, such that said pair of thin-walled portions are opposed to each other in one diametrical of the mount, each of said pair of thin-walled portions extending between said inner and said outer sleeves, in a direction substantially parallel to the axial direction of said inner and outer sleeves, and having axially opposite ends, only one of which is connected to said inner sleeve, and the other of which is connected to said outer sleeve.

11. A fluid-filled cylindrical elastic mount according to claim 10, wherein at least one of said radial inner and said radial outer surfaces of the resonance member is completely detached from the inner wall of the fluid chamber so that said fluid passage defining said resonance portion is annular in shape.

12. A fluid-filled cylindrical elastic mount according to claim 10, wherein both of said radial inner and said radial outer surfaces of said resonance member are completely detached from the inner wall of the fluid chamber such that said resonance member floats in said fluid chamber.

13. A fluid-filled cylindrical elastic mount comprising:

an inner sleeve including a cylindrical portion;

a flange member fixed to one axial end of said cylindrical portion of said inner sleeve, and extending radially outwardly from said one axial end of said cylindrical portion;

an outer sleeve having a cylindrical portion which is disposed radially outwardly of said cylindrical portion of said inner sleeve, with a predetermined radial spacing left therebetween, and a flange portion which is positioned opposite to said flange member in the axial direction of the mount, with a predetermined axial spacing left therebetween;

a first elastic body having a generally cylindrical shape, which is interposed between said inner sleeve and said cylindrical portion of said outer sleeve for elastically connecting the inner and outer sleeves to each other;

a second elastic body having a generally annular shape, which is interposed between said flange member and said flange portion of said outer sleeve, for elastically connecting said flange member and said outer sleeve to each other;

said first and second elastic bodies cooperating with each other to define an annular fluid chamber located between said inner and said outer sleeves, said fluid chamber being filled with a non-compressible fluid;

at least one resonance member accommodated in said fluid chamber, said at least one resonance member having an outer surface cooperating with an inner wall of said fluid chamber to define a resonance portion through which said non-compressible fluid is caused to flow upon application of a vibrational load, said resonance portion having a predetermined clearance between said outer surface and said inner wall; and said first elastic body including a pair of thin-walled portions which are formed on diametrically opposite sides of said inner sleeve, such that said pair of thin-walled portions are opposed to each other in one diametrical direction of the mount, each of said pair of thin-walled portions extending between said inner and said outer sleeves, in a direction substantially parallel to the axial direction of said inner and outer sleeves, and having axially opposite ends one of which is connected to said inner sleeve, and the other of which is connected to said outer sleeve;

wherein said first elastic body also includes a pair of thick-walled portions which are formed on diametrically opposite sides of said inner sleeve such that said pair of thick-walled portions are opposed to each other in another diametrical direction of the mount that is orthogonal to said one diametrical direction.

14. A fluid-filled cylindrical elastic mount according to claim 13, wherein a pair of restriction plates are formed in said thick-walled portions of said first elastic body.

* * * * *